United States Patent
Martinelli

(10) Patent No.: US 12,470,377 B2
(45) Date of Patent: Nov. 11, 2025

(54) MODULAR QUANTUM KEY DISTRIBUTION SYSTEM AND RELATIVE MODULATION MODULE AND DEMODULATION MODULE

(71) Applicant: POLITECNICO DI MILANO, Milan (IT)

(72) Inventor: Mario Martinelli, Milan (IT)

(73) Assignee: POLITECNICO DI MILANO, Milan (IT)

( * ) Notice: Subject to any disclaimer, the term of this patent is extended or adjusted under 35 U.S.C. 154(b) by 159 days.

(21) Appl. No.: 18/550,161

(22) PCT Filed: Mar. 11, 2022

(86) PCT No.: PCT/IB2022/052199
§ 371 (c)(1),
(2) Date: Sep. 12, 2023

(87) PCT Pub. No.: WO2022/195419
PCT Pub. Date: Sep. 22, 2022

(65) Prior Publication Data
US 2025/0080337 A1    Mar. 6, 2025

(30) Foreign Application Priority Data
Mar. 15, 2021    (IT) .................... 102021000006095

(51) Int. Cl.
*H04L 9/08*    (2006.01)
*H04B 10/70*    (2013.01)

(52) U.S. Cl.
CPC ........... *H04L 9/0852* (2013.01); *H04B 10/70* (2013.01)

(58) Field of Classification Search
CPC .......................... H04L 9/0852; H04B 10/70
See application file for complete search history.

(56) References Cited

U.S. PATENT DOCUMENTS

| | | | | |
|---|---|---|---|---|
| 2007/0248229 | A1* | 10/2007 | Kawamoto | H04L 9/0858 380/256 |
| 2012/0087500 | A1* | 4/2012 | Ukita | H04L 9/0858 380/256 |
| 2019/0222415 | A1* | 7/2019 | Kikawada | H04L 9/0858 |

FOREIGN PATENT DOCUMENTS

CN    111130779 A    5/2020

OTHER PUBLICATIONS

International Search Report mailed Jul. 27, 2022, in correspoding International Application No. PCT/IB2022/052199, 4 pages.
(Continued)

*Primary Examiner* — Baotran N To
(74) *Attorney, Agent, or Firm* — Maier & Maier, PLLC

(57) ABSTRACT

A modular quantum key distribution system and relative modulation module and demodulation module. The system includes: a photon source module; a modulation module, physically separated from the source module and operatively connected to the source module by a first optical communication channel and including a first polarization stabilizer and a first retarder plate and a second retarder plate, placed downstream of the first polarization stabilizer and controlled by an actuator; and a receiving unit operatively connected to the modulation module by a second optical communication channel and including a second polarization stabilizer, a third retarder plate, placed downstream of the second polarization stabilizer and controlled by an actuator, a polarizing beam splitter, placed downstream of the third retarder plate, and a single photon photodetector configured to detect a logic state of each photon and transmit the detected logic state to a counting register.

18 Claims, 5 Drawing Sheets

(56) References Cited

OTHER PUBLICATIONS

Written Opinion of the International Searching Authority mailed Jul. 27, 2022, in corresponding to International Application No. PCT/IB2022/052199, 7 pages.

Kazuya Niizeki et al., "Ultrabright narrow-band telecom two-photon source for long-distance quantum communication", arxiv.org, Cornell University Library, Mar. 21, 2018, XP081224463, 11 pages.

Christian Schimpf et al., "Quantum cryptography with highly entangled photons from semiconductor quantum dots", arxiv.org, Cornell University Library, Jul. 24, 2020, XP081726964, 7 pages.

Xin-He Jiang et al., "Quantum teleportation mediated by surface plasmon polariton", arxiv.org, Cornell University Library, Dec. 18, 2019, xp081562261, 27 pages.

Rishab Chatterjee et al., "qkdSim: An experimenter's simulation tookit for QKD with imperfections, and its performance analysis with a demonstration of the B92 protocol using heralded phtons" arxiv.org, Cornell University Library, Dec. 20, 2019, XP081564734, 29 pages.

\* cited by examiner

MODULAR QUANTUM KEY DISTRIBUTION SYSTEM AND RELATIVE MODULATION MODULE AND DEMODULATION MODULE

CROSS-REFERENCE TO RELATED APPLICATIONS

This application is a National Stage Application of International Application No. PCT/IB2022/052199, filed on Mar. 11, 2022, and the PCT application is based upon and claims the benefit of priority from Italian Patent Application No. 102021000006095, filed on Mar. 15, 2021, the entire contents of which are incorporated by reference in their entireties.

TECHNICAL FIELD

The present invention relates to the technical field of quantum cryptography. In particular, the present invention relates to a modular quantum key distribution system and to relative modulation module and demodulation module.

BACKGROUND

Quantum key distribution (QKD) is a technology that makes it possible to share a symmetrical (i.e. a sequence of bits that materialises simultaneously in the transmitter and receiver) and unconditionally secure (i.e. one that cannot be decrypted with any algorithm and no computing power) "key" between two nodes (hereafter transmitter Tx and receiver Rx). The adjective quantum refers to the fact that the key is generated using the spin state of a single photon (classically known as the polarization state).

It is known from quantum mechanics that the spin state of a particle can only be exactly measured if it is in the exact reference base (which may be rectilinear, diagonal or circular), otherwise the measurement generates a completely random value. The second quantum property that is exploited is the impossibility of cloning the spin state of a particle. The third quantum property is related to light and the possibility of generating and propagating a single photon in any optical communication channel (free space, optical fibre or optical-integrated guide).

Based on these properties of photons, in 1984 C. H. Bennet and G. Brassard developed a protocol known as BB84, which will be referred to in the present patent application.

In the BB84 protocol, the transmitter Tx transmits a sequence of single photons generated in a known base and in a known state (according to a bit logic sequence). The receiver Rx receives the single photons (except those lost through attenuation) and measures the state in a randomly chosen base. The state measurement generates the bit logic sequence. The receiver Rx transmits, with a public communication channel, the sequence of bases used in the measurement to the transmitter Tx. The transmitter Tx transmits to the receiver Rx the confirmation of the exact ones. In this way, the transmitter Tx and the receiver Rx share a logic sub-sequence of bits forming the quantum key.

The original scheme of the QKD according to the BB84 protocol refers to a point-to-point transmission (i.e. the transmitter Tx is connected with only one receiver Rx) and concerns the communication of a quantum key between the transmitter Tx and the receiver Rx through an optical communication channel without birefringence. In the more general case, where there is an optical communication channel that shows birefringence (which is the case dealt with in this patent application), at the end of the transmission, the original base must be re-established through a device called a polarization stabilizer.

The transmitter Tx comprises a single photon source, i.e. a source weakened in intensity so as to transmit on average only one photon (faint source), and a first and second retarder plate, controlled by an actuator, to which the single polarized photons exiting the single photon source are sent. The first retarder plate allows to establish the base (which may be rectilinear, diagonal or circular) of the photon spin, whereas the second retarder plate allows to establish the state which generates the bit logic sequence forming the key (e.g. logic high state equivalent to 1, logic low state equivalent to 0).

The receiver Rx comprises a polarization stabilizer, in the case of a birefringent optical transmission channel, which enables the initial base to be reoriented, and a retarder plate, controlled by an actuator, placed downstream of the polarization stabilizer, which allows to re-establish (or not) the initial base, with a random process. The receiver further comprises a Polarizing Beam Splitter (PBS), to which each photon exiting the retarder plate is addressed and which is configured to distinguish the high logic state and the low logic state of the polarized photon and transmit them to a photodetection unit, such as a counting register, so that the code transmitted by the transmitter Tx can be reconstructed.

The components of the transmitter Tx and of the receiver Rx are also connected therebetween, so as to distribute, between the transmitter and the receiver, a synchronism signal, typically generated by a control signal of a shutter, placed at the transmitter Tx, immediately downstream of the single photon source, or by the same pulse of the single photon source.

In the quantum key distribution system described above, both the base information and the code information are possessed by the receiver Rx and this fully satisfies the integrity of the BB84 protocol. However, a system so configured has some disadvantages.

Firstly, if a system component is modified or upgraded, the entire transmitter Tx and/or the entire receiver Rx must be upgraded, which is functionally disadvantageous as well as being economically costly.

Secondly, and as it is well known, sometimes the single photon source and the photodetection unit in the device have to be kept at very low temperatures, so the transmitter Tx and the receiver Rx of the device must be placed in environments controlled with cryogenic technology, which is logistically disadvantageous, with a negative impact in terms of space and maintenance.

SUMMARY

Aim of the present invention is to overcome the disadvantages of the prior art.

In particular, aim of the present invention is to present a modular quantum key distribution system, configured to allow greater flexibility in defining the network architecture.

It is also an aim of the present invention to present a modular quantum key distribution system, configured to allow modification, upgrade and/or maintenance of single components of the system.

It is also an aim of the present invention to present a multipoint-to-multipoint quantum key distribution system, that is, in which a plurality of transmission nodes exchange quantum keys with a plurality of receiving nodes and at the same time maintain a sharing of both the source module and of the photodetection module.

These and other purposes of the present invention are achieved by a quantum key distribution system, a modulation module and a demodulation module incorporating the features of the appended claims, which form an integral part of the present description.

According to a first aspect, the invention is directed to a quantum key distribution system comprising:
- a photon source module;
- a modulation module, physically separated from the source module and operatively connected to the source module through a first optical communication channel, the modulation module comprising a first polarization stabilizer, a first retarder plate and a second retarder plate placed downstream of the first polarization stabilizer and controlled by an actuator; and
- a receiving unit, operatively connected to the modulation module through a second optical communication channel and comprising a second polarization stabilizer, a third retarder plate, placed downstream of the second polarization stabilizer and controlled by an actuator, a polarizing beam splitter, placed downstream of the third retarder plate and a single photon photodetector configured to detect a logic state of each photon and to transmit the detected logic state to a counting register.

Thanks to the physical separation of the modulation module from the source module, considerable advantages can be achieved. First of all, the physical separation of the two modules allows greater flexibility in defining the network architecture, as in fact systems with a single source module and multiple modulation modules can be provided. In addition, the source module and the modulation module can be replaced or maintained separately, with advantages in terms of maintenance and flexibility of system development. For example, it is possible to upgrade the system, switching from a first source module to a more efficient one, which requires to be maintained in an environment controlled with cryogenic technology, without having to change the modulation module.

In one embodiment, the receiving unit comprises a demodulation module and a photodetection module, which are physically separated from each other and in optical communication. The demodulation module comprises the second polarization stabilizer, the third retarder plate, the actuator for controlling the third retarder plate, the polarizing beam splitter and the counting register. The photodetection module comprises the single photon photodetector. The demodulation module is operatively connected to the modulation module through the second optical communication channel, whereas the photodetection module is operatively connected to the demodulation module through a third optical communication channel.

In one embodiment, the demodulation module further comprises a fourth retarder plate, placed downstream of the third retarder plate and controlled by an actuator, preferably associated to the counting register. The fourth retarder plate advantageously inserts an additional randomness into the polarization states of the photons before they are detected with a sequence known to the receiving unit.

In one embodiment, the photon source module comprises a single photon source.

In one embodiment, the photon source module also comprises a shutter, positioned downstream of the single photon source to generate a synchronisation signal, which is distributed in the system along a synchronisation line.

In one embodiment, the photon source module comprises a parametric two photon source. The use of such a two photon source, which generates a first and a second photon, is particularly advantageous, as the emission of the second photon acts as an indicator of the emission of the first photon. In other words, the detection of the second photon ensures that the first photon has been introduced into the system.

In one embodiment, the source module further comprises a single photon detector, of a semiconductor or superconductor type, positioned downstream of the parametric two photon source and configured to detect a second photon exiting the parametric two photon source and generate at the output a synchronism signal, which is distributed system along a synchronism line.

In one embodiment, the first, second and third optical communication channels consist of optical fibres.

In one embodiment, the third optical communication channel comprises a pair of optical fibres.

In one embodiment, the first retarder plate of the modulation module allows to establish a base of the spin of each photon entering the modulation module through the first optical communication channel, whereas the second retarder plate of the modulation module allows to establish the state or code which generates the bit logic sequence forming the quantum key.

In one embodiment, the system comprising a second modulation module and a second demodulation module, which are connected therebetween, and to the source module and the photodetection module, by means of respective second, first and third optical communication channels.

In one embodiment, the system comprises a first switching device associated to the source module and/or a second switching device associated to the photodetection module. The first switching device is operatively connected to each modulation module by a respective first optical communication channel. The second switching device is operatively connected to each demodulation module by a respective third optical communication channel.

In one embodiment, the system comprises a third switching device associated to each modulation module and a fourth switching device associated to each demodulation module. The third switching device is operatively connected to the respective fourth switching device by each second optical communication channel.

In one embodiment, the system comprises at least a second modulation module and a second receiving unit, which are connected therebetween and to the source module by means of second and first optical communication channels.

In one embodiment, the system further comprises a supervisor device, configured to activate the first and third optical communication channels of each modulation and demodulation module or the first and second optical communication channel of each modulation module and receiving unit.

According to a second aspect, the invention is also directed to a modulation module comprising a polarization stabilizer connected to an input optical port for receiving a photon transmitted by a source module. The modulation module also comprises a first retarder plate and a second retarder plate placed downstream of the polarization stabilizer and an actuator adapted to control the first retarder plate and the second retarder plate for modulating the polarization of the photon. Finally, the modulation module comprises an optical output port for transmitting the modulated photon through an optical communication channel.

According to a third aspect, the invention is also directed to a demodulation module comprising a polarization stabilizer connected to an input optical port for receiving a photon transmitted by a modulation module. The demodulation module further comprises a retarder plate, placed downstream of the polarization stabilizer, and an actuator adapted to control the retarder plate for demodulating the polarization of the photon. The demodulation module further comprises a polarizing beam splitter placed downstream of the retarder plate and configured to distinguish the high or low logic state of the received photon. Finally, the demodulation module comprises a counting register configured to receive a logic state of the photon transmitted by a photodetection module.

In one embodiment, the demodulation module also comprises an additional retarder plate, placed downstream of the retarder plate and controlled by an actuator, preferably associated to the counting register.

Further features and advantages of the present invention will be more evident from the description of the accompanying drawings.

BRIEF DESCRIPTION OF THE DRAWINGS

The invention is described hereinbelow with reference to certain examples provided by way of non-limiting example and illustrated in the accompanying drawings. These drawings illustrate different aspects and embodiments of the present invention and reference numerals illustrating structures, components, materials and/or similar elements in different drawings are indicated by similar reference numerals, where appropriate.

DETAILED DESCRIPTION OF THE EMBODIMENTS

While the invention is susceptible to various modifications and alternative constructions, some embodiments provided for explanatory purposes are described in detail below.

It must in any case be understood that there is no intention to limit the invention to the specific embodiment illustrated, but, on the contrary, the invention intends covering all the modifications, alternative and equivalent constructions that fall within the scope of the invention as defined in the claims.

In the following description, therefore, the use of "e.g.", "etc.", "or" indicates non exclusive alternatives without limitation, unless otherwise indicated; the use of "also" means "including, but not limited to" unless otherwise indicated; the use of "includes/comprises" means "includes/comprises, but not limited to" unless otherwise indicated.

Figure 1:
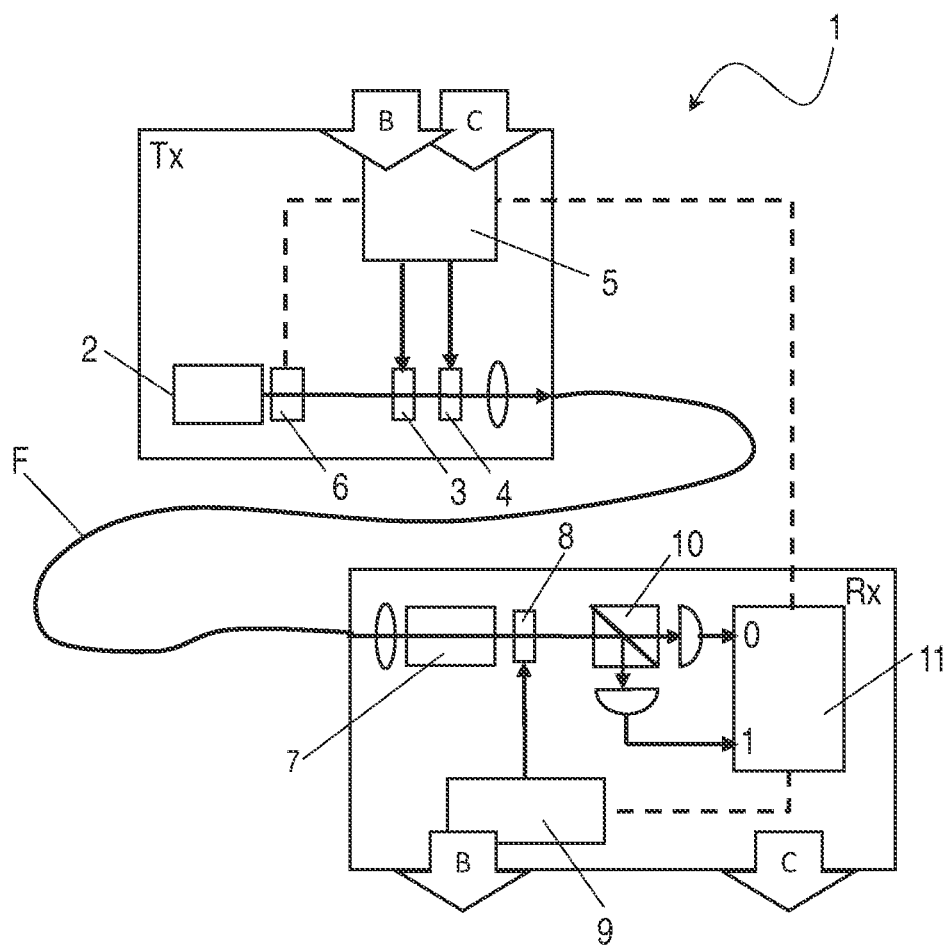
FIG. 1 schematically shows a quantum key distribution system according to the prior art.

With reference to FIG. 1, a quantum key distribution system according to the prior art is illustrated therein.

The system, generally referred to as reference number 1, comprises a transmitting unit Tx and a receiving unit Rx, operatively connected to each other by an optical communication channel, typically consisting of an optical fibre F.

The transmitting unit Tx comprises a single photon source 2, i.e. a source weakened in intensity so as to transmit on average only one photon (faint source), and a first 3 and second retarder plate 4, controlled by an actuator 5, and to which the single polarized photons, or qubits, exiting the single photon source 2 are sent.

The first retarder plate 3 allows to establish the base B (which may be rectilinear, diagonal or circular) of the photon spin, whereas the second retarder plate 4 allows to establish the state or code C which generates the bit logic sequence forming the key (e.g. logic high state equivalent to 1, logic low state equivalent to 0).

The receiving unit Rx comprises a polarization stabilizer 7, in the case of a birefringent optical communication channel, which enables the initial base B to be reoriented, and a retarder plate 8, controlled by an actuator 9, placed downstream of the polarization stabilizer 7, which allows to re-establish (or not) the initial base, with a random process. The receiving unit Rx further comprises a polarizing beam splitter 10, to which each polarized photon exiting the retarder plate 8 is addressed and which is configured to distinguish the logic high state 1 or the logic low state 0 and transmit them to a counting register 11, to allow reconstruction of the code C transmitted by the transmitting unit Tx along the optical fibre F.

Preferably, the components of the transmitting unit Tx and of the receiving unit Rx are connected therebetween (dotted line in FIG. 1), so as to distribute, between the transmitting unit Tx and the receiving unit Rx, a synchronism signal, typically generated by a control signal of a shutter 6, placed at the transmitting unit Tx, immediately downstream of the single photon source 2, or by the same pulse of the single photon source 2.

Figure 2:
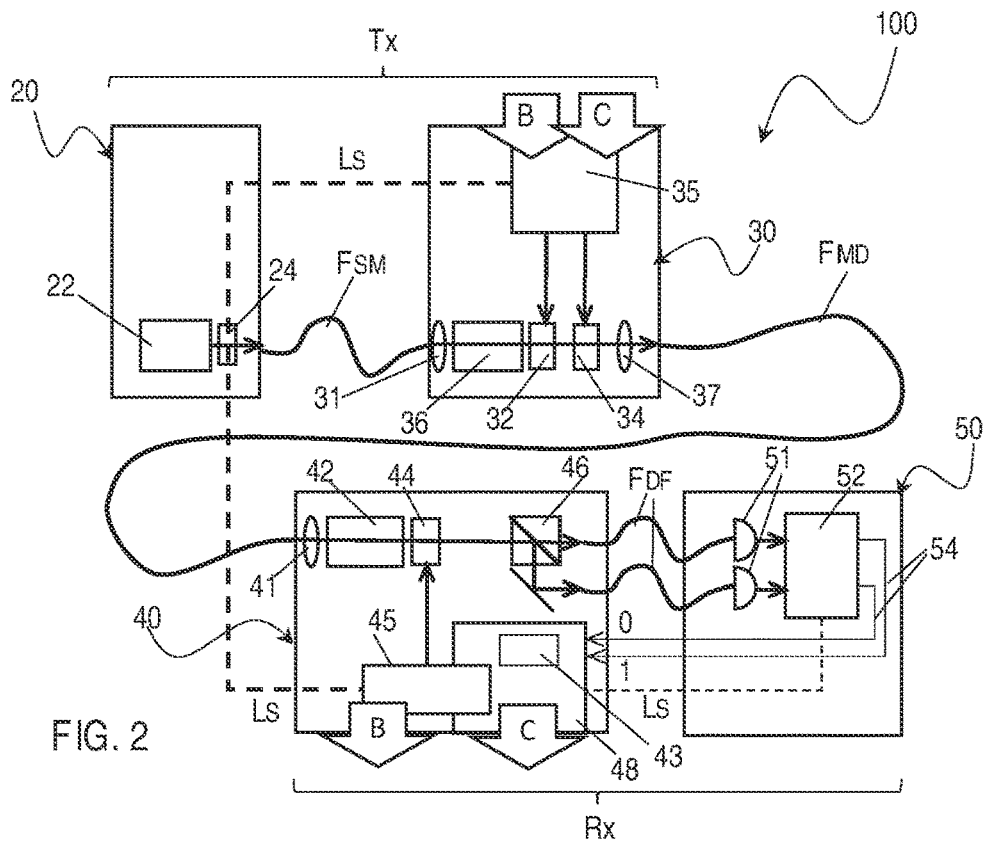
FIG. 2 schematically shows a modular quantum key distribution system according to a first embodiment of the present invention.

With reference to FIG. 2, therein it is shown a modular quantum key distribution system according to a first embodiment of the present invention.

The system, generally referred to by the reference number 100, comprises a source module 20, a modulation module 30, a demodulation module 40 and a photodetection module 50, which are operatively connected therebetween by a respective optical communication channel, for example by a respective optical fibre. Alternatively, the optical communication channel may be a free space channel or an integrated optical fibre channel.

The source module 20 and the modulation module 30 form the transmitting unit Tx of the system 100, whereas the demodulation module 40 and the photodetection module 50 form the receiving unit Rx of the system 100.

The source module 20 comprises a single photon source 22 and, preferably, a shutter 24, positioned immediately downstream of the single photon source 22 and having the function of generating a synchronism signal, which is distributed between the transmitting unit Tx and the receiving unit Rx of the system 100 along a synchronism line Ls. Alternatively, the synchronisation signal can be generated from the same pulse as the single photon source 22. The source module 20 is physically separated from the modulation module 30 and connected thereto by a first optical communication channel, for example by an optical fibre $F_{SM}$.

The modulation module 30 comprises a first retarder plate 32 and a second retarder plate 34, controlled by an actuator 35 and to which the polarized single photons, or qubits, exiting the single photon source 22 of the source module 20 are sent.

The first retarder plate 32 allows to establish the base B (which may be rectilinear, diagonal or circular) of the spin of the polarized photon entering the modulation module 30 through the standard optical fibre $F_{SM}$, whereas the second retarder plate 34 allows to establish the state or code C which generates the bit logic sequence forming the key (e.g. logic high state equivalent to 1, logic low state equivalent to 0). The base is established starting from a predefined state by the action of half-wave or quarter-wave retarder plates, as is well known to experts in the field. The value of the state (high or low) can be generated by a half-wave retarder plate suitably oriented according to the chosen base, as is well known to experts in the field.

Since the optical fibre $F_{SM}$ for the connection between the source module 20 and the modulation module 30 shows in general birefringence, the modulation module 30 further comprises, upstream of the retarder plates 32 and 34, a first polarization stabilizer 36, which is connected to an input optical port 31, represented by a lens, of the modulation module 30 for receiving a photon transmitted by the source module 20 and for reorienting the base B of the photon spin.

The demodulation module 40 is physically separated from the modulation module 30 and operatively connected thereto by a second optical communication channel, for example by an optical fibre $F_{MD}$.

The demodulation module 40 comprises a second polarization stabilizer 42, connected to an input optical port 41, represented by a lens, of the demodulation module 40 for receiving a modulated photon, exiting an output optical port 37, represented by a lens, of the modulation module 30, and for reorienting the initial base B of the photon spin.

The demodulation module 40 further comprises a third retarder plate 44, controlled by an actuator 45 and placed downstream of the second polarization stabilizer 42, which allows to re-establish (or not) the initial base B of the photon spin, with a random process. Finally, downstream of the third retarder plate 44 there is a polarizing beam splitter 46, to which each polarized photon exiting the third retarder plate 44 is directed.

The photodetection module 50 is physically separated from the demodulation module 40 and comprises a single photon photodetector 52, preferably a superconducting nanowire single photon photodetector. The photodetection module 50 is operatively connected to the demodulation module 40 by a third optical communication channel, specifically by a pair of optical fibres $F_{DF}$, each of which receives the single photon exiting the polarizing beam splitter 46 of the demodulation module 40 at a respective input optical port 51, represented by a lens.

The logic states, high 1 or low 0, detected by the single photon photodetector 52 of the photodetection module 50 are sent to a counting register 48 of the demodulation module 40 through respective standard communication channels 54, so as to recompose the information to the receiving unit Rx.

In general, each optical fibre of the pair of optical fibres $F_{DF}$ shows birefringence, which in this case does not cause any problems because the photodetectors in the photodetection module 50 are generally insensitive to the polarization state.

In the system 100 described above, since in the receiving unit Rx, specifically in its demodulation module 40, the base information B is disjointed from the information of code C, which travels on reserved but not unconditionally secure channels, the integrity conditions of the BB84 protocol are missing. However, if the pair of optical fibres $F_{DF}$ connecting the demodulation module to the photodetection module and the standard communication channels 54 between the two modules are adequately protected, for example they are inside the same building, the integrity conditions of the BB84 protocol are restored.

Figure 3:
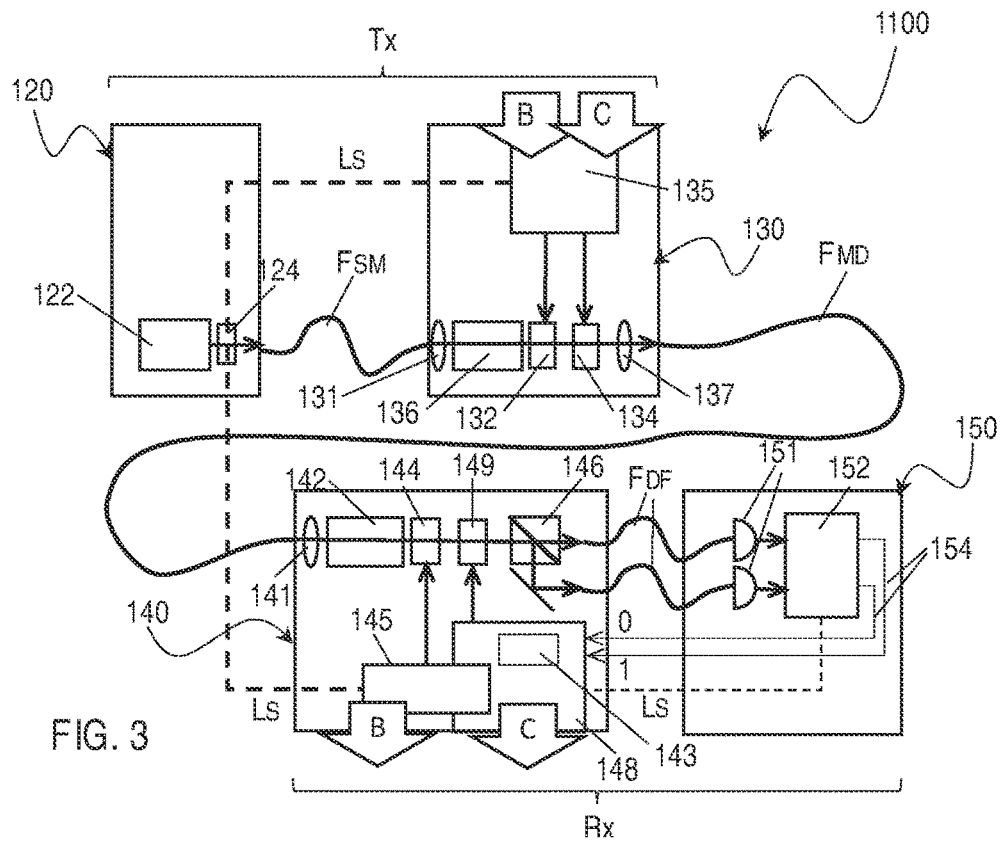
FIG. 3 schematically shows a modular quantum key distribution system in accordance with a second embodiment of the present invention.

With reference to FIG. 3, a quantum key distribution system in accordance with a second alternative embodiment of the present invention is illustrated therein.

The system, generally referred to by reference number 1100 is entirely similar to the system 100 described above with reference to FIG. 2, from which it differs in that it provides, within the demodulation module, a fourth retarder plate.

The system 1100 thus comprises a source module 120, a modulation module 130, a demodulation module 140 and a photodetection module 150, which are operatively connected therebetween by a respective optical communication channel, for example by an optical fibre.

The source module 120 and the modulation module 130 form the transmitting unit Tx of the system 1100, whereas the demodulation module 140 and the photodetection module 150 form the receiving unit Rx of the system 1100.

The source module 120 comprises a single photon source 122 and, preferably, a shutter 124, positioned immediately downstream of the single photon source 122 and having the function of generating a synchronism signal, which is distributed between the transmitting unit Tx and the receiving unit Rx of the system 100 along a synchronism line Ls. The source module 120 is physically separated from the modulation module 130 and connected thereto by a first optical communication channel, for example by an optical fibre $F_{SM}$.

The modulation module 130 comprises a first retarder plate 132, which allows to establish the base B (rectilinear, diagonal or circular) of the spin of each polarized photon entering the modulation module 130, and a second retarder plate 134, which allows to establish the state or code C which generates the bit logic sequence forming the key. The first 132 and the second retarder plate 134 are controlled by an actuator 135. The modulation module 130 further comprises, upstream of the retarder plates 132 and 134, a first polarization stabilizer 136, which is connected to an input optical port 131 of the modulation module 30 for receiving a photon transmitted by the source module 120 and for reorienting the base B of the photon spin.

The demodulation module 140 is physically separated from the modulation module 130 and connected thereto by a second optical communication channel, for example by an optical fibre $F_{MD}$.

The demodulation module 140 comprises a second polarization stabilizer 142, connected to an input optical port 141 of the demodulation module 40 for receiving a modulated photon, exiting an output optical port 137 of the modulation module 130 and for reorienting the initial base B of the photon spin. The demodulation module 140 further comprises a third retarder plate 144, controlled by an actuator 145 and placed downstream of the second polarization stabilizer 142, which allows to re-establish (or not) the initial base B of the photon spin, with a random process.

The demodulation module 140 further comprises, downstream of the third retarder plate 144, a polarizing beam splitter 146, to which each polarized photon exiting the third retarder plate 144 is directed.

The photodetection module 150 is physically separated from the demodulation module 140 and comprises a single photon photodetector 152, preferably a superconducting nanowire single photon photodetector. The photodetection module 150 is operatively connected to the demodulation module 140 by a third optical communication channel, in particular by a pair of optical fibres $F_{DF}$, each of which receives the single photon exiting the polarizing beam splitter 146 of the demodulation module 140 at a respective input optical port 151.

The logic states, high 1 or low 0, detected by the single photon photodetector 152 of the photodetection module 150 are sent to a counting register 148 of the demodulation module 140 through respective standard communication channels 154, so as to recompose the information to the receiving unit Rx.

The demodulation module 140 further comprises a fourth retarder plate 149, placed downstream of the third retarder plate 144 and controlled by an actuator 143, preferably associated to the counting register 148. The fourth retarder plate 149 inserts a further randomness into the polarization states of the photons, before they are detected in a sequence known to the receiving unit Rx. In this way, the receiving unit Rx is the only one to know the logic state of the information transmitted by the photodetection module 150. This makes it possible, advantageously, to restore the integrity of the BB84 protocol.

Figure 4:
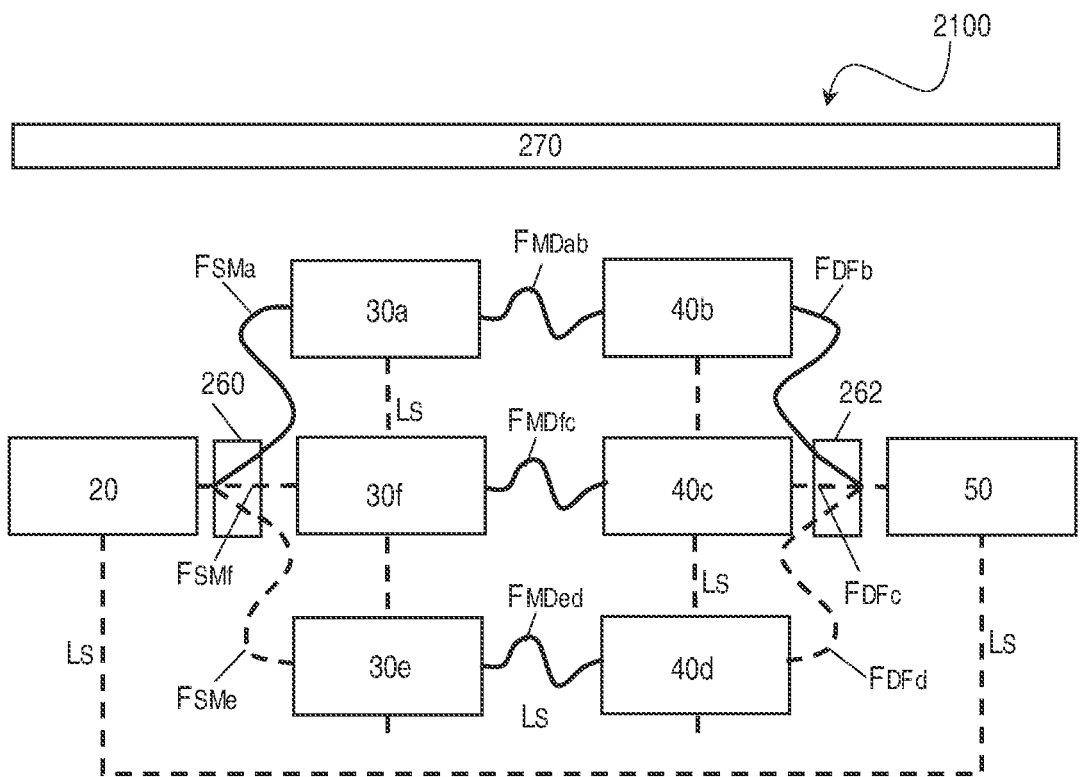
FIG. 4 schematically shows a modular quantum key distribution system according to a third embodiment of the present invention.

With reference to FIG. 4, a quantum key distribution system according to a third embodiment of the present invention is illustrated therein.

The system, generally referred to by reference number 2100, comprises at least two pairs of modulation and demodulation modules, and a source module 20 and a photodetection module 50, which are shared between the pairs of modulation and demodulation modules. The modules are physically separated from each other and connected by respective optical communication channels, preferably by respective optical fibres.

In the illustrated example, the system 2100 comprises three pairs of modulation and demodulation modules, respectively 30a, 40b, 30f, 40c and 30e, 40d, each configured to advantageously generate its own quantum key, not shared by any other pair of modulation and demodulation modules of the system.

The source module 20 is connected to the modulation module 30a, 30f, 30e of each pair of modulation and demodulation modules by a respective first optical communication channel, e.g. by a respective optical fibre $F_{SMa}$, $F_{SMf}$, $F_{SMe}$. The demodulation module 40b, 40c, 40d of each pair of modulation and demodulation modules is connected to the respective modulation module 30a, 30f, 30e by a respective second optical communication channel, for example by a respective optical fibre $F_{MDab}$, $F_{MDfc}$, $F_{MDed}$. The photodetection module 50 is connected to each demodulation module 40b, 40c, 40d of the pair of modulation and demodulation modules by a respective third optical communication channel, for example by a respective optical fibre $F_{DFb}$, $F_{DFc}$, $F_{DFd}$.

The source module 20 and the photodetection module 50 of the system 2100 are operatively connected to a first switching device, respectively 260 and 262, each controlled by a supervisor device 270, so as to assign the optical communication channel of the single photon, i.e., both the first optical communication channel $F_{SMa}$, $F_{SMf}$, $F_{SMe}$ between source module 20 and modulation module 30a, 30f, 30e and the third optical communication channel $F_{DFb}$, $F_{DFc}$, $F_{DFd}$ between demodulation module 40b, 40c, 40d and photodetection module 50, to each pair of modulation and demodulation modules.

Figure 5:
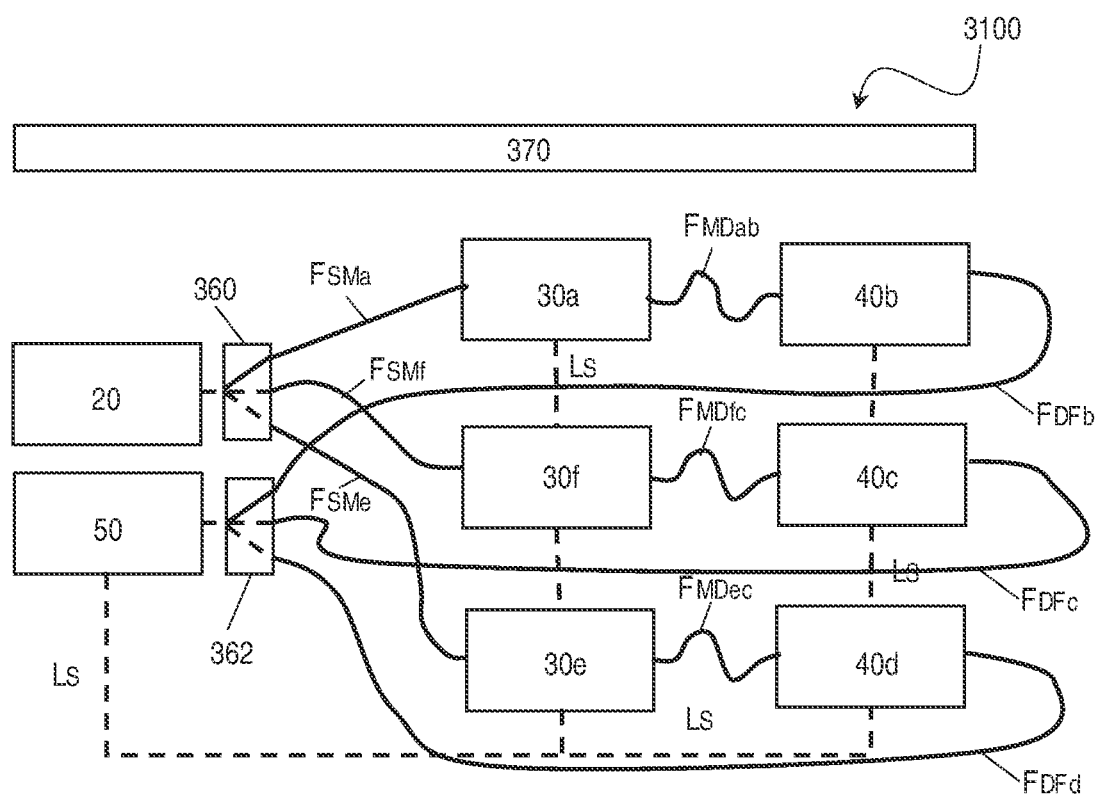
FIG. 5 schematically shows a modular quantum key distribution system according to a fourth embodiment of the present invention.

With reference to FIG. 5, a quantum key distribution system according to a fourth embodiment of the present invention is illustrated therein, which differs from the system 2100 of FIG. 4 in that the photodetection module 50 is placed in the same location as the source module 20.

The system, generally referred to by reference number 3100, thus comprises at least two pairs of modulation and demodulation modules, in the example three pairs of modulation and demodulation modules, respectively 30a, 40b, 30f, 40c and 30e, 40d, and a source module 20 and a photodetection module 50, which are shared between the pairs of modulation and demodulation modules.

The source module 20 is physically separated from and connected to the modulation module 30a, 30f, 30e of each pair of modulation and demodulation modules by a respective first optical communication channel, e.g. by a respective optical fibre $F_{SMa}$, $F_{SMf}$, $F_{SMe}$. The demodulation module 40b, 40c, 40d of each pair of modulation and demodulation modules is physically separated from and connected to the respective modulation module 30a, 30f, 30e by a respective second optical communication channel, for example by a respective optical fibre $F_{MDab}$, $F_{MDfc}$, $F_{MDed}$. The photodetection module 50 is physically separated from and connected to each demodulation module 40b, 40c, 40d by a respective third optical communication channel, for example by a respective optical fibre $F_{DFb}$, $F_{DFc}$, $F_{DFd}$.

The source module 20 and the photodetection module 50 of the system 2100 are operatively connected to a first switching device, respectively 360 and 362, each controlled by a supervisor device 370, so as to assign the single photon communication channel, i.e., both the first optical communication channel $F_{SMa}$, $F_{SMf}$, $F_{SMe}$ between source module 120 and modulation module 30a, 30f, 30e and the third optical communication channel $F_{DFb}$, $F_{DFc}$, $F_{DFd}$ between demodulation module 40b, 40c, 40d and photodetection module 50, to each pair of modulation and demodulation modules.

Figure 6:
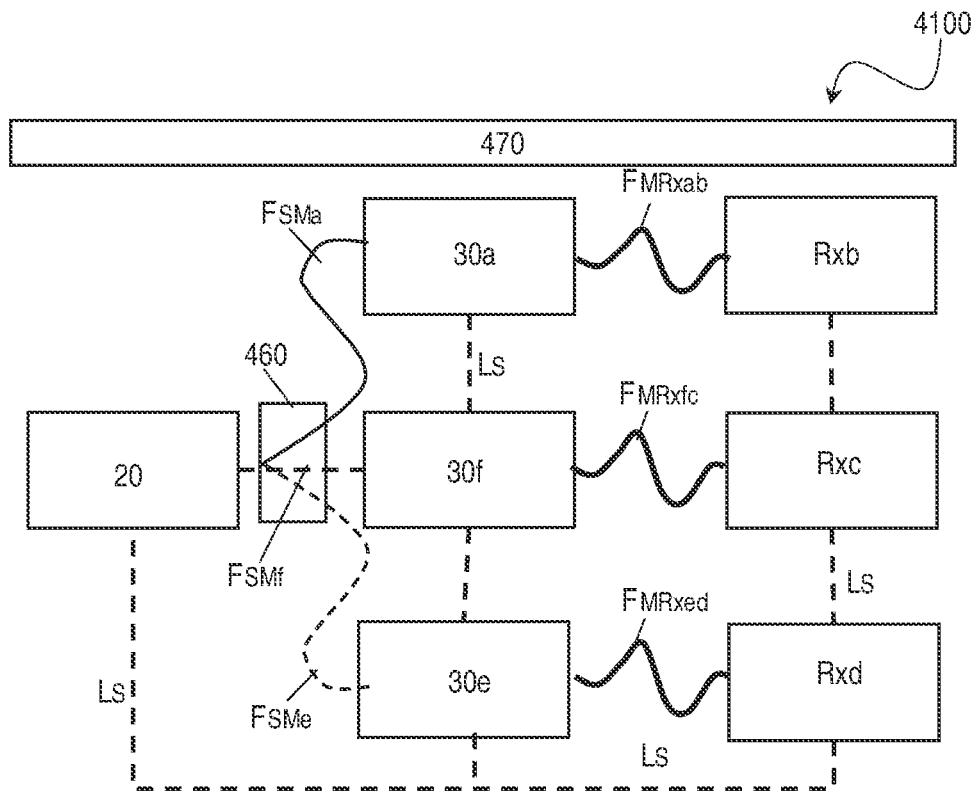
FIG. 6 schematically shows a modular quantum key distribution system according to a fifth embodiment of the present invention.

FIG. 6 illustrates a quantum key distribution system according to a fifth embodiment of the present invention, which differs from the systems 2100 and 3100 of FIGS. 4 and 5 in that only the source module 20 is shared by the pairs of modulation and demodulation modules, whereas, instead of providing pairs of demodulation and demodulation modules operatively connected therebetween by a respective optical communication channel, there are receiving units Rxb, RXc, Rxd, operatively connected to the respective modulation module 30a, 30f, 30e by a second optical communication channel, for example by a respective optical fibre $F_{MRxab}$, $F_{MRxfc}$, $F_{MRxed}$.

Each receiving unit Rxb, Rxc, Rxd therefore comprises a second polarization stabilizer 42, 142, a third retarder plate 44, 144, placed downstream of the second polarization stabilizer and controlled by an actuator 45, 145, a polarizing beam splitter 46, 146, placed downstream of the retarder plate 44, 144 and a single photon photodetector 52, 152, configured to detect a logic state of each photon and transmit the detected logic state to a counting register 48, 148.

The source module 20 is connected to each modulation module 30a, 30f, 30e by a first optical communication channel, for example by a respective optical fibre $F_{SMa}$, $F_{SMf}$, $F_{Sme}$ and each modulation module 30a, 30f, 30e is connected to a respective receiving unit Rxb, Rxc, Rxd by the respective optical fibre $F_{MRxab}$, $F_{MRxfc}$, $F_{MRxed}$.

The source module 20 of the system 4100 is operatively connected to a first switching device 460, which is controlled by a supervisor device 470, so as to assign the single photon communication channel, i.e., both the first optical communication channel $F_{SMa}$, $F_{SMf}$, $F_{Sme}$ between source module 20 and modulation module 30a, 30f, 30e and the second optical communication channel $F_{MRxab}$, $F_{MRxfc}$, $F_{MRxed}$ between modulation module 30a, 30f, 30e and receiving unit Rxb, Rxc, Rxd, to each pair of modulation module and receiving unit.

Figure 7:
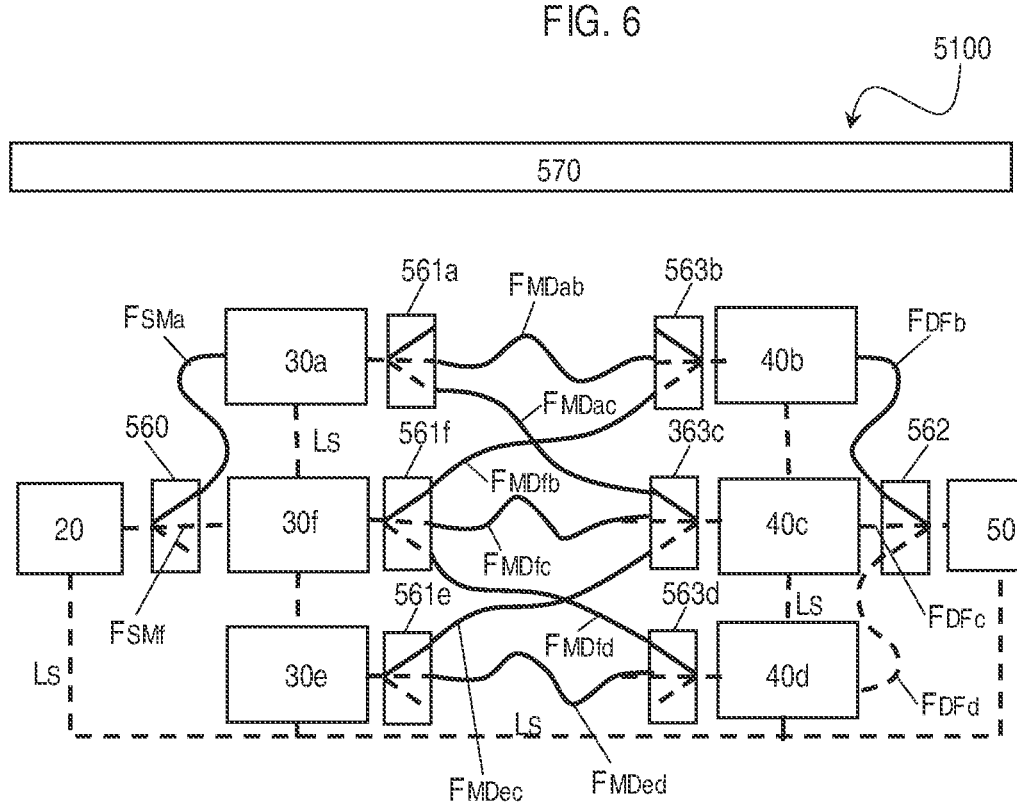
FIG. 7 shows a modular quantum key distribution system according to a sixth embodiment of the present invention.

With reference to FIG. 7, a quantum key distribution system according to a sixth preferred embodiment of the present invention is illustrated therein, which differs from the systems 2100 and 3100 in that it also provides a switching device at the modulation and demodulation modules. In this way, each module of the system can exchange a quantum key with a plurality of modules.

The system, generally referred to by reference number 5100, comprises at least two pairs of modulation and demodulation modules, and a source module 20 and a photodetection module 50, which are shared between the pairs of modulation and demodulation modules. The modules are physically separated from each other.

In the illustrated example, the system comprises three pairs of modulation and demodulation modules, respectively 30a, 40b, 30f, 40c and 30e, 40d, each configured to advantageously generate its own quantum key, not shared by any other pair of modulation and demodulation modules of the system 5100.

The source module 20 is connected to the modulation module 30a, 30f of the pairs of modulation and demodulation modules by a first optical communication channel, e.g. by a respective optical fibre $F_{SMa}$, $F_{SMf}$.

The demodulation module 40b is connected to the modulation modules 30a and 30f by respective second optical communication channels, e.g. by respective optical fibres $F_{MDab}$ and $F_{MDfb}$. The demodulation module 40c is connected to the modulation modules 30a, 30f, 30e by respective second optical communication channels, e.g. by respective optical fibres $F_{MDac}$, $F_{MDfc}$ and $F_{MDec}$. The demodulation module 40d is connected to the modulation modules 30f and 30e by respective second optical communication channels, e.g. by respective optical fibres $F_{MDfd}$ and $F_{MDed}$.

The photodetection module 50 is connected to the demodulation modules 40b, 40c, 40d by respective third optical communication channels, e.g. by respective optical fibres $F_{DFb}$, $F_{DFc}$, $F_{DFd}$.

The source module 20 and the photodetection module 50 of the system 5100 is operatively connected to a first switching device, respectively 560 and 562. A third 561a, 561f, 561e and a fourth switching device and 563b, 563c, 563d are also operatively connected to each modulation module 30a, 30f, 30e and to each demodulation module 40b, 40c, 40d.

Each switching device 560, 562, 561a, 561f, 561e and 563b, 563c, 563d is controlled by a supervisor device 570, such that each module of the system can exchange a quantum key with a plurality of modules.

Figure 8:
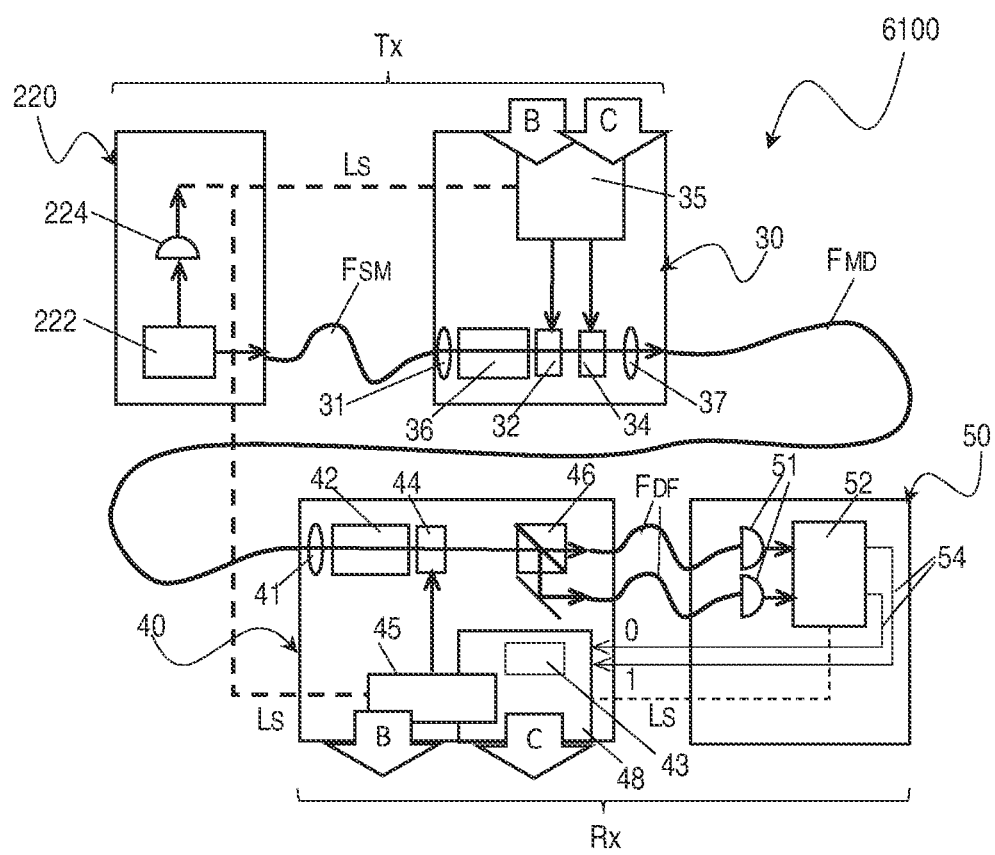
FIG. 8 schematically shows a modular quantum key distribution system in accordance with a seventh embodiment of the present invention.

With reference to FIG. 8, a quantum key distribution system in accordance with a seventh alternative embodiment of the present invention is illustrated therein.

The system, generally referred to as reference number 6100, is quite similar to the system 100 described above with reference to FIG. 2, from which it differs in that the source module comprises a parametric two photon source, rather than a single photon source.

The system 6100 thus comprises a source module 220 comprising a parametric two photon source 222, for example of the SPDC (Spontaneous Parametric Down Conversion) type and, preferably, a single photon detector 224 of a semiconductor or superconductor type, positioned immediately downstream of the parametric two photon source 222 and having the function of generating a synchronism signal, which is distributed between a transmitting unit Tx and a receiving unit Rx of the system 2100 along a synchronism line Ls.

In particular, the parametric two photon source 222 generates a first photon and a second photon, of which the first photon is introduced into a first optical communication channel, for example in an optical fibre $F_{SM}$, whereas the second photon is preferably detected by the single photon detector 224, which generates at the output the synchronism signal, which is distributed in the system along the synchronism line Ls.

Naturally, the source module 220 with a parametric two photon source, shown in FIG. 8 and applied to the system 100 of FIG. 2, can be used in place of the source module (20, 120) with single photon source in all the other systems 1100, 2100, 3100, 4100, 5100.

In all the systems 100, 1100, 2100, 3100, 4100, 5100, 6100 described above, the synchronism is distributed through the synchronism line Ls. In addition, each system 100, 1100, 2100, 3100, 4100, 5100 also share classic communication channels (not shown).

From the above description it is evident that the system, the modulation module and the demodulation module for quantum key distribution, described above, enable the proposed objects to be achieved.

It is therefore obvious to a person skilled in the art that it is possible to make changes and variations to the solution described with reference to the figures without thereby departing from the scope of protection of the present invention as defined by the appended claims.

The invention claimed is:

1. A quantum key distribution system, comprising:
   a photon source module;
   a modulation module, physically separated from the source module and operatively connected to the source module through a first optical communication channel, the modulation module comprising a first polarization stabilizer, a first retarder plate and a second retarder plate, placed downstream of the first polarization stabilizer and controlled by an actuator; and
   a receiving unit, operatively connected to the modulation module through a second optical communication channel and comprising a second polarization stabilizer, a third retarder plate, placed downstream of the second polarization stabilizer and controlled by an actuator, a polarizing beam splitter, placed downstream of the third retarder plate and a single photon photodetector configured to detect a logic state of each photon and transmit the detected logic state to a counting register.

2. The quantum key distribution system according to claim 1, wherein the receiving unit comprises a demodulation module and a photodetection module,
   wherein the demodulation module comprises the second polarization stabilizer, the retarder plate, the actuator for controlling the retarder plate, the polarizing beam splitter and the counting register;

wherein the photodetection module comprises the single photon photodetector; and wherein the demodulation module is operatively connected to the modulation module through the second optical communication channel and the photodetection module is operatively connected to the demodulation module through a third optical communication channel.

3. The quantum key distribution system according to claim 2, wherein the demodulation module further comprises a fourth retarder plate, placed downstream of the retarder plate and controlled by an actuator associated to the counting register.

4. The quantum key distribution system according to claim 1, wherein the source module comprises a single photon source.

5. The quantum key distribution system according to claim 4, wherein the source module further comprises a shutter, positioned downstream of the single photon source and configured to generate a synchronism signal, which is distributed in the system along a synchronism line.

6. The quantum key distribution system according to claim 1, wherein the source module comprises a parametric two photon source.

7. The quantum key distribution system according to claim 6, wherein the source module further comprises a single photon detector of a semiconductor or superconductor type, positioned downstream of the parametric two photon source and configured to detect a second photon exiting the parametric two photon source and generate at the output a synchronism signal, which is distributed in the system along a synchronism line.

8. The quantum key distribution system according to claim 1, wherein the first, second and third optical communication channels consist of optical fibres.

9. The quantum key distribution system according to claim 2, wherein the third optical communication channel comprises a pair of optical fibres.

10. The quantum key distribution system according to claim 1, wherein the first retarder plate of the modulation module allows for establishment of a base of the spin of each photon entering the modulation module through the first optical communication channel, whereas the second retarder plate allows to establish the state or code which generates the bit logic sequence forming the quantum key.

11. The quantum key distribution system according to claim 2, further comprising a second modulation module and a second demodulation module, which are connected therebetween, and to the source module and the photodetection module, by respective second, first and third optical communication channels.

12. The quantum key distribution system according to claim 11, further comprising a first switching device associated to the source module and/or a second switching device associated to the photodetection module, wherein the first switching device is operatively connected to each modulation module by a respective first optical communication channel and wherein the second switching device is operatively connected to each demodulation module by a respective third optical communication channel.

13. The quantum key distribution system according to claim 12, further comprising a third switching device associated to each modulation module and a fourth switching device associated to each demodulation module, wherein the third switching device is operatively connected to the respective fourth switching device by a respective second optical communication channel.

14. The quantum key distribution system according to claim 1, further comprising a second modulation module and a second receiving unit, which are connected therebetween and to the source module by respective second and first optical communication channels.

15. The quantum key distribution system according to claim 11, further comprising a supervisor device, configured to activate the first and third optical communication channels of each modulation module and demodulation module or the first and second optical communication channels of each modulation module and receiving unit.

16. A modulation module, comprising:
a polarization stabilizer connected to an input optical port for receiving a photon transmitted by a photon source module;
a first retarder plate and a second retarder plate, placed downstream of the first polarization stabilizer;
an actuator adapted to control the first retarder plate and the second retarder plate (34; 134) for modulating the polarization of the photon; and
an optical output port for transmitting the modulated photon through an optical communication channel.

17. A demodulation module comprising:
a polarization stabilizer connected to an input optical port for receiving a modulated photon by a modulation module;
a retarder plate, placed downstream of the polarization stabilizer;
an actuator, which is adapted to control the retarder plate for demodulating the polarization of the photon;
a polarizing beam splitter, placed downstream of the retarder plate and configured to distinguish the high or low logic state associated to the received photon; and
a counting register, configured to receive a logic state of the photon transmitted by a photodetection module.

18. The demodulation module according to claim 17, further comprising an additional retarder plate, placed downstream of the retarder plate and controlled by an actuator.

* * * * *